(12) United States Patent
Benco et al.

(10) Patent No.: US 7,546,343 B2
(45) Date of Patent: Jun. 9, 2009

(54) SYSTEM AND METHOD FOR SUPPORTING VIRTUAL CONFERENCES

(75) Inventors: David S Benco, Winfield, IL (US); Kevin J Overend, Elmhurst, IL (US); Baoling S Sheen, Naperville, IL (US); Sandra Lynn True, St. Charles, IL (US); Kenneth J Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1060 days.

(21) Appl. No.: 10/668,849

(22) Filed: Sep. 23, 2003

(65) Prior Publication Data

US 2005/0066001 A1 Mar. 24, 2005

(51) Int. Cl.
*G06F 15/16* (2006.01)
*H04N 7/14* (2006.01)

(52) U.S. Cl. .................... 709/204; 348/14.1
(58) Field of Classification Search ........... 709/201–25, 709/217–219, 226–232, 203–204; 348/14.1
See application file for complete search history.

(56) References Cited

U.S. PATENT DOCUMENTS

| 5,905,499 | A | * | 5/1999 | McDowall et al. | 345/419 |
| 5,999,208 | A | * | 12/1999 | McNerney et al. | 348/14.08 |
| 6,127,990 | A | * | 10/2000 | Zwern | 345/8 |
| 6,421,324 | B1 | * | 7/2002 | Boyle et al. | 370/261 |
| 6,629,129 | B1 | * | 9/2003 | Bookspan et al. | 709/204 |
| 6,754,323 | B1 | * | 6/2004 | Chang et al. | 379/205.01 |
| 6,895,558 | B1 | * | 5/2005 | Loveland | 715/746 |
| 7,346,654 | B1 | * | 3/2008 | Weiss | 709/204 |
| 2003/0037101 | A1 | * | 2/2003 | Torabi | 709/203 |

* cited by examiner

*Primary Examiner*—Yasin M Barqadle
(74) *Attorney, Agent, or Firm*—Steven R. Santema

(57) ABSTRACT

A system for supporting virtual conferences includes a switching center, a virtual conference database and a virtual conference bridge. The virtual conference database stores virtual conference information comprising, for example, images associated with a room type, an outdoor environment, a presentation medium and/or a meeting room facility. The switching center is operable to set up a virtual conference including a host terminal and one or more participating terminals by connecting the terminals to the conference bridge, retrieving selected virtual conference information from the virtual conference database and sending the information to the virtual conference bridge. The virtual conference information includes images of the participants such that the host terminal and participating terminals see and hear other participants in a virtual meeting room.

20 Claims, 3 Drawing Sheets

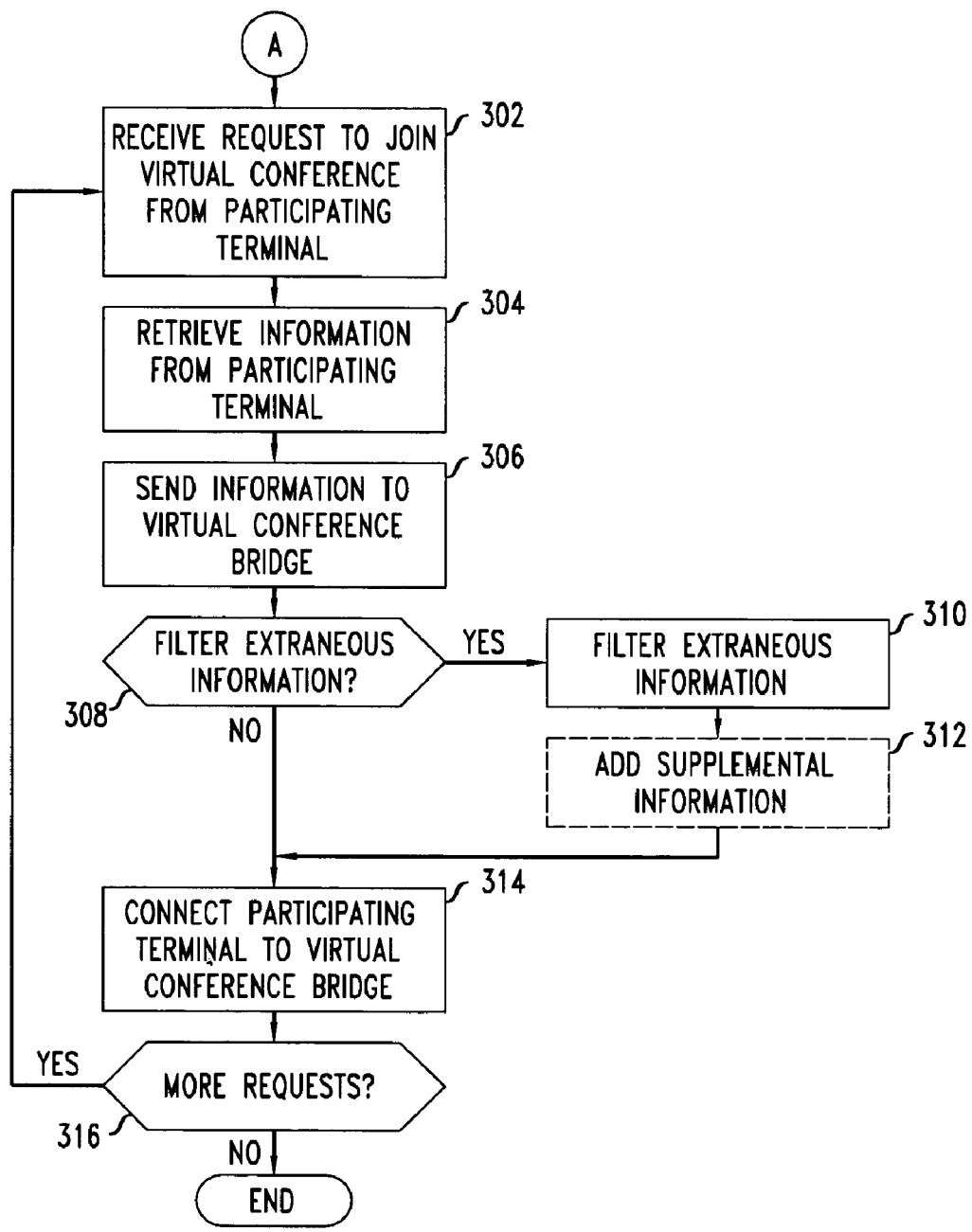

SYSTEM AND METHOD FOR SUPPORTING VIRTUAL CONFERENCES

FIELD OF THE INVENTION

This invention relates generally to the field of communication systems and, more particularly, to systems and methods supporting remote conferences having virtual reality features ("virtual conferences").

BACKGROUND OF THE INVENTION

Communication systems are well known that support communications among participants at remote locations using audio, video and/or electronic media. For example, audio conference bridges are known to support voice communication ("conference calls") with participants dispersed at various locations. Similarly, video conference facilities are known to support video (and voice) communications between parties at remote locations. Still further, software products such as Windows® NetMeeting® are known to support communications between computers at remote locations. Whatever type of communication network infrastructure is employed, remote communication meetings ("conferences") are generally considered more efficient and cost-effective than face-to-face meetings (i.e., among participants at a common location) because they reduce or eliminate the need for travel among the participants. However, some limitations with existing remote conference services is that group dynamics can be impaired; geographic separation is apparent to all participants, creating a lack of interactive quality and natural flow. Even in the case of video conferences (because video conference facilities rely on a camera whose field-of-view only focuses on the speaker), participants generally can not see all other participants of the meeting and hence can not observe expressions, reactions, body language of all other participants. Moreover, participants do not visually see common meeting room facilities, presentation media and the like. Further, depending on limitations of technology, impairments can occur in voice and/or video transmission causing delays, interruptions, frozen images and the like.

Because remote conference services offer advantages in cost and efficiency relative to face-to-face meetings, there is a continuing need for communication systems and methods supporting and/or enhancing communications among participants at remote locations. On the other hand, because certain characteristics of face-to-face meetings offer advantages in group dynamics and interaction among participants, there is a need for remote conference services that resemble or at least more closely approximate face-to-face meetings, thereby overcoming or minimizing deficiencies of the prior art. The present invention is directed to addressing these needs.

SUMMARY OF THE INVENTION

These problems are solved and a technical advance is achieved in the art by a feature whereby virtual reality technology is used to support communications ("virtual conferences") between parties at remote locations. The virtual conferences provide or at least approximate attributes of face-to-face meetings including, without limitation, a common meeting room or place ("virtual meeting room") having common meeting room facilities, presentation media and the like and further provide the ability of participants to see and speak with other participants in the virtual meeting room.

In one embodiment, a method of the invention comprises receiving a request to set up a virtual conference from a host terminal. Attributes of the virtual conference may be determined by selection of options by the host terminal including, for example, room type or outdoor environment, presentation media and/or meeting room facilities. Information supporting the selected attributes is retrieved and at least a portion of the information is sent to a virtual conference bridge. The host terminal is connected to the virtual conference bridge, thereby establishing a virtual conference including (initially) the host terminal. Thereafter, other participating terminals may join the virtual conference so as to receive virtual conference information via the virtual conference bridge. The virtual conference information comprises information retrieved from a virtual conference database, the host terminal and/or the participating terminals. The retrieved information may be filtered and/or supplemented before it is sent to the conference bridge.

In another embodiment, a method of the invention comprises establishing a virtual conference comprising a host terminal and one or more participating terminals connected to a virtual conference bridge. Thereafter, virtual conference information comprising, for example, images associated with a selected room type, outdoor environment, presentation media and/or meeting room facilities are communicated among the host terminal and one or more participating terminals via the virtual conference bridge.

In yet another embodiment, a system of the invention comprises a switching center, a virtual conference database and a virtual conference bridge. The virtual conference database stores virtual conference information comprising, for example, images associated with a room type, an outdoor environment, a presentation medium and/or a meeting room facility. The switching center is operable to retrieve selected virtual conference information from the virtual conference database and send the information to the virtual conference bridge. The switching center is further operable to connect a host terminal and one or more participating terminals to the virtual conference bridge, thereby establishing a virtual conference where the host terminal and participating terminals may receive the selected virtual conference information.

BRIEF DESCRIPTION OF THE DRAWINGS

The foregoing and other advantages of the invention will become apparent upon reading the following detailed description and upon reference to the drawings in which:

FIG. 3 is a flowchart of a method of adding a requesting device to a virtual conference according to an embodiment of the invention.

DESCRIPTION OF THE PREFERRED EMBODIMENT(S)

Figure 1:
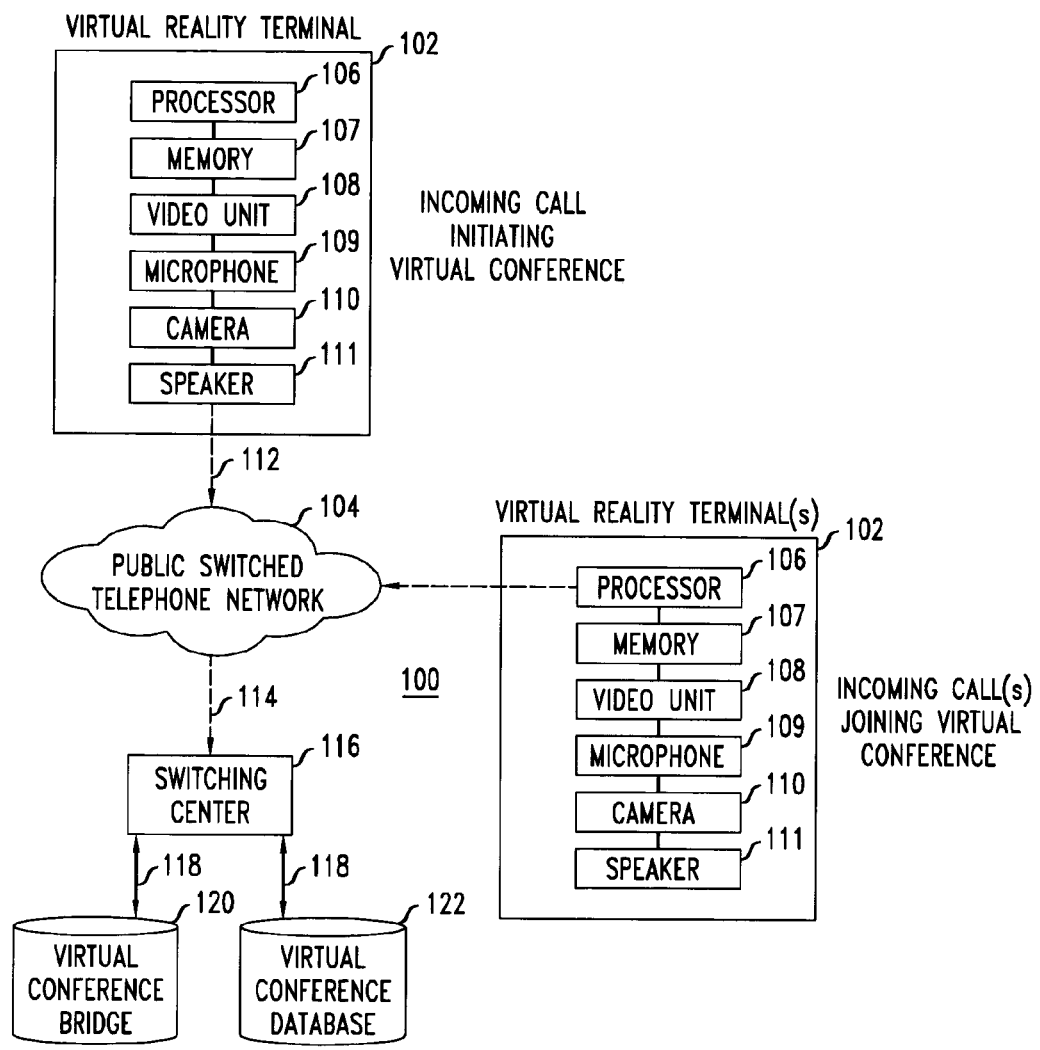
FIG. 1 is a block diagram of a communication system in which embodiments of the present invention may be implemented.

FIG. 1 depicts a communications system 100 including virtual reality terminals 102 connected to the public switched telephone network (PSTN) 104. In one embodiment, the virtual reality terminals 102 comprise headgear (not shown) including processor 106, memory 107, video unit 108, microphone 109, camera 110 and speaker 111 such that participants wearing the headgear can see and hear other participants in a virtual meeting room. As will be appreciated, however, virtual reality terminals 102 may differ in form and/or functionality as virtual reality technology evolves and will generally differ according to different manufacturers and product lines. For example, it is contemplated that virtual reality terminals 102 may reside in physical structures other than headgear, such as computer- or desk-mounted units or wireless radio/telephones. Further, it is contemplated that different terminals 102 may have different capabilities and may utilize different formats or communications protocols. For example, it is likely that different terminals 102 will have different video display formats and/or resolution.

Generally, the processor 106 (comprising, for example, a microprocessor, microcontroller, digital signal processor or combination of such devices) performs computing functions including, without limitation, encoding/decoding functions, control functions and software program execution for operation of the headset. The memory 107 comprises, for example, a volatile or non-volatile digital storage device or combination of such devices. The microphone 109 and camera 110 capture a participant's voice and facial image; the video unit 108 displays other participants' facial images, virtual meeting room images, presentation media and the like; and the speaker 111 broadcasts messages, voices and/or sounds associated with the meeting.

The terminals 102 are connected to the PSTN 104 by links 112 which may comprise, without limitation, a conventional subscriber line, ISDN line, Ethernet LAN and/or wireless link(s). Generally, any of the terminals 102 may be sources or recipients of calls and may initiate or join virtual conferences by sending control and/or payload information via links 112 to the PSTN. The PSTN is connected via link 114 to a call processing control entity ("switching center") 116.

The switching center 116 may comprise, for example, a 5ESS® switching system, available from Lucent Technologies, Inc. As will be appreciated, the switching center 116 is a functional entity that may reside in multiple physical switches or combined into a single switch. The switching center 116 may be configured for operation with generally any suitable circuit, cell, or packet switching technology. The switching center includes a memory and processor (not shown), for storing and executing software routines for processing and switching calls, for providing various call features to calling parties including virtual conference services, and for providing access to the PSTN 104.

Link 114 is a logical link that may be physically realized, without limitation, by conventional subscriber lines, ISDN lines, WAN links, wireless links, and the like. Link 114 carries signaling information and/or payload information between the switching center 116 and PSTN 104. In one embodiment, the payload information comprises multimedia information including, without limitation, voice, video, data and/or text information necessary to support virtual conference services.

As shown, data links 118 connect the switching center to a virtual conference bridge 120 and virtual conference database 122. The data links 118 may comprise LAN or WAN links or virtually any type of link suitable for transporting multimedia payload information or signaling information between the switching center 116 and virtual conference bridge. In one embodiment, the virtual conference bridge 120 comprises a network element having a memory and processor (not shown) for setting up and tearing down virtual conferences between virtual reality terminals 102 dispersed among various locations. The virtual conference bridge may reside within a single device or may be distributed among multiple devices.

The virtual conference database 122 stores information including subscriber data and service information. In one embodiment, the subscriber data includes information including capabilities and characteristics of different subscriber terminals 102. The service information includes subscriber preferences and settings and multimedia content associated with virtual conference services. For example, in one embodiment, the service information includes a menu of different virtual meeting images from which subscribers may select including, without limitation, different "rooms" (e.g., office, board room, auditorium or outdoor environment), different color schemes, different presentation media (e.g., chalkboard, whiteboard, wall charts, PowerPoint™ slides) and so forth. As will be appreciated, the subscriber data may be modified from time to time to add, remove or change terminal information, service information, subscriber preferences and the like.

Figure 2:
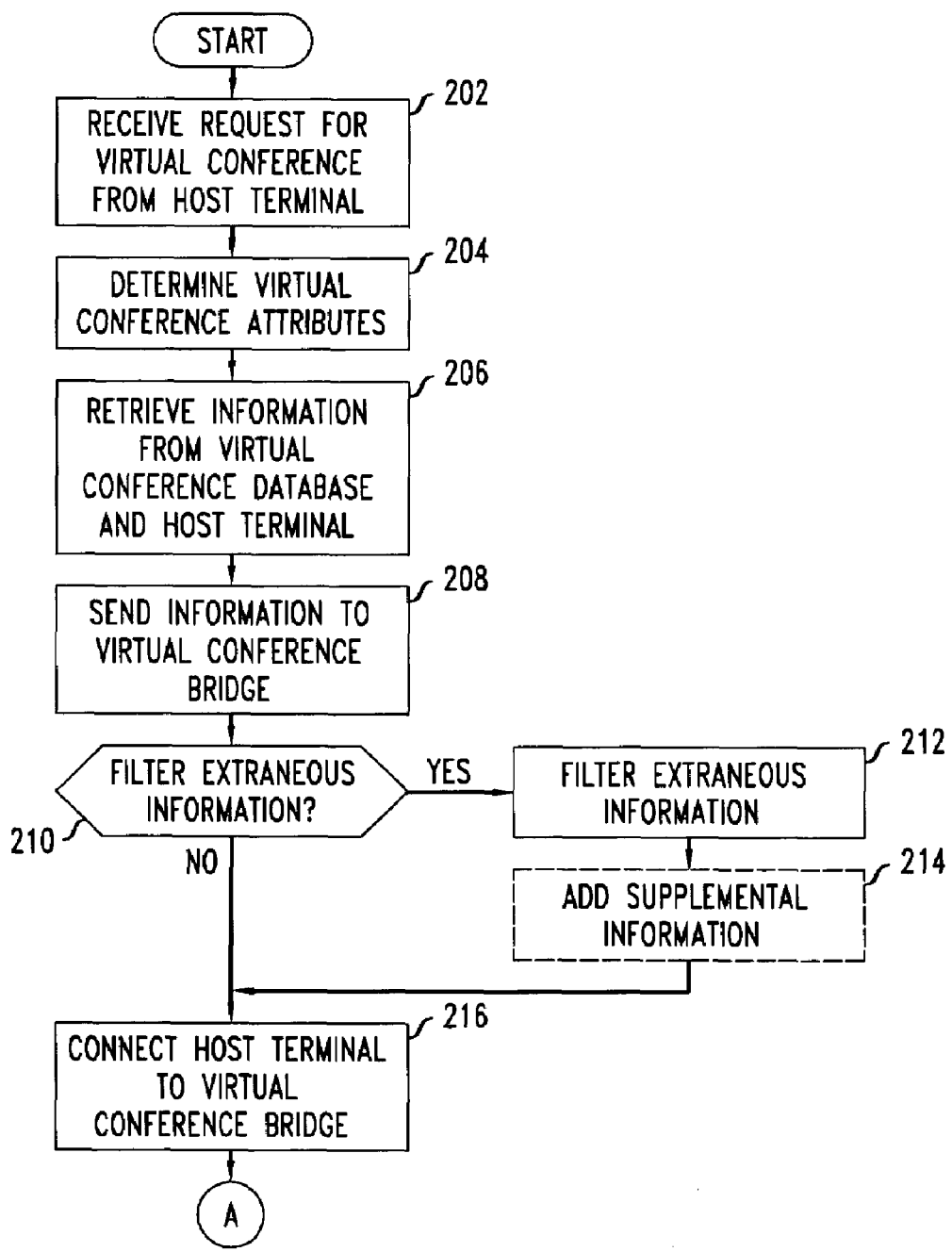
FIG. 2 is a flowchart of a method for setting up a virtual conference according to an embodiment of the invention.

Turning now to FIG. 2, there is shown a flowchart of a method that may be implemented in the communication system of the type shown in FIG. 1, for setting up a virtual conference. The steps of FIG. 2 are implemented, where applicable, using stored software routines within the switching center 116, conference bridge 120 and/or host virtual reality terminal 102.

The method begins at block 202, when the switching center 116 receives a request for a virtual conference from a host (or host terminal). The term "host" as used herein, refers to an individual initiating the virtual conference whereas the term "host terminal" refers to the virtual reality terminal 102 operated by the host. The host may initiate the request by calling a particular number, entering a code, pressing a button, using a point-and-click method or using generally any other appropriate user interface available to the host.

At step 204, the switching center 116 determines virtual conference attributes/characteristics. In one embodiment, the attributes are determined according to options selected by the host. The options include, without limitation, different rooms/backgrounds (e.g., office, board room, auditorium or outdoor environment) and different facilities/presentation media (e.g., chalkboard, whiteboard, wall charts, PowerPoint™ slides). The options may be selected by the host and communicated to the switching center in advance (and stored in the database 122 for later retrieval by the switching center) or may be selected and/or communicated to the switching center in conjunction with the request for virtual conference. The selections may be entered independently by the host or responsive to querying by the switching center. The selections may be entered using the host terminal 102 and/or using an alternative interface such as a web-based service. Alternatively or additionally, the switching center may determine certain attributes of the conference independently, which options may supplement or override selections of the host. For example, the switching center might select certain "default" options to the extent they are non-selected by the host; or the switching center might select an alternative option if a selected option is inoperable or unavailable to the host terminal. As another example, certain options may be available or not available to the host terminal based on a service/subscription level of the host or on a "pay-per-view" basis (not unlike satellite or cable television channel packages and pay-per-view channels).

Having determined the virtual conference attributes at step 204, the switching system at step 206 retrieves information, as appropriate, from the virtual conference database 122 and/or the host terminal 102. In one embodiment, attributes including rooms/backgrounds, facilities and presentation media are retrieved from the virtual conference database 122 whereas information unique to the host (e.g., facial image) are retrieved from the host terminal 102. As will be appreciated, attributes might also be retrieved from the host terminal and supplemented as needed or desired with information from the database 122, or vice versa.

At step 208, the switching system sends the retrieved information, or at least a portion of the retrieved information, to the virtual conference bridge. Alternatively or additionally, the virtual conference bridge retrieves the information, or a portion of the information, from the switching system.

At step 210, the conference bridge determines whether extraneous information exists that is to be filtered. For example, in the case where the host terminal 102 comprises a headset, it is contemplated that the facial image produced by the host terminal 102 may be obscured in part by portions of the headset. In such case, the conference bridge may choose to "filter" or remove the image of the headset ("extraneous information") from the facial image. As will be appreciated, the extraneous information may include virtually any information received by the host terminal that conflicts with or detracts from the desired virtual meeting attributes. Optionally, the host may participate in the determination of whether to filter and/or the type and extent of information to be filtered responsive to querying by the conference bridge.

If extraneous information is to be filtered, the conference bridge accomplishes the filtering at step 212. Optionally, the conference bridge adds supplemental information at step 214 to replace or overwrite the filtered information. For example, in the case where the facial image was obscured by a headset and the headset is filtered/removed, the removed portion of the image may be "filled in" as appropriate to give the appearance of a complete facial image. Supplemental information might also be added by the conference bridge to compensate for inadequate or incomplete information retrieved from the host terminal 102 via the switching center 116. As an example, the conference bridge might retrieve a stored facial image of the host to override a missing, inadequate or incomplete image retrieved from the host terminal via the switching center 116.

At step 216, the switching system connects the host terminal to the virtual conference bridge 120. Methods for connecting end terminals to a conference bridge are well known and will not be described in detail herein. Suffice it to say that the connection establishes a communication path between the conference bridge and the host terminal, thereby setting up an initial virtual conference link of a virtual conference. Further, as will be described in greater detail in relation to FIG. 3, other participants join the virtual conference by connecting to the virtual conference bridge thereby establishing additional virtual conference links. The host terminal and other participating terminals exchange information with the conference bridge, and each other, via the virtual conference links during the virtual conference.

Turning to FIG. 3, there is shown a flowchart of a method that may be implemented in the communication system of the type shown in FIG. 1, for participating terminals to join a virtual conference. The method presumes a virtual conference has already been set up (i.e., an initial virtual conference link established between a host terminal and conference bridge) according to the method of FIG. 2. The steps of FIG. 3 are implemented, where applicable, using stored software routines within the switching center 116, conference bridge 120 and/or participating terminals 102.

At block 302, the switching center 116 receives a request to join the virtual conference from a participating terminal 102. The term "participating terminal" refers to a virtual reality terminal that will join the conference initiated by the host terminal. In one embodiment, the participating terminal (or more accurately, the individual operating the participating terminal) initiates the request by calling a particular number ("bridge number") associated with the virtual conference bridge. Alternatively, the participating terminal may signal a request to join the conference by entering a code, pressing a button or using generally any other appropriate signal that is identifies to the switching center the particular conference that is desired.

At step 304, the switching center 116 retrieves information, as appropriate, from the participating terminal 102. In one embodiment, the retrieved information comprises information unique to the operator of the participating terminal, such as the operator's facial image. As will be appreciated, the retrieved information might be supplemented as needed or desired with information from the database 122, or vice versa.

At block 306, the switching center forwards the information, or at least a portion of the information, to the conference bridge 120. Alternatively or additionally, the conference bridge 120 retrieves the information, or a portion of the information, from the switching center 116.

At step 308, the conference bridge determines whether extraneous information exists that is to be filtered. For example, the conference bridge may filter or remove the image of a headset from an operator's facial image, substantially as has been described in relation to FIG. 2. If extraneous information is to be filtered, the conference bridge accomplishes the filtering at step 310. Optionally, the conference bridge adds supplemental information at step 312 to replace or overwrite the filtered information, substantially as has been described in relation to FIG. 2.

At step 314, the switching system connects the participating terminal to the virtual conference bridge 120, thereby causing the participating terminal to join the virtual conference and to see and hear other participants in a virtual meeting having selected characteristics. If there are further requests to join the conference, determined at step 316, the process repeats and information is received pertaining to the additional participating terminal(s), the information may be filtered at step 310 and/or supplemented at step 312 and the additional terminals are connected to the conference at step 314.

The present invention may be embodied in other specific forms without departing from its spirit or essential characteristics. For example, the order of steps performed in FIG. 2 and FIG. 3 may be changed, steps performed by the switching center may be performed by the virtual conference bridge or vice versa; or steps may be performed by network device(s) other than the switching center or virtual conference bridge. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
    receiving, from a host terminal, a request to set up a virtual conference, the virtual conference defining a communication forum for communicating virtual conference information among a plurality of virtual reality terminals including the host terminal, the virtual conference information including one or more virtual images;
    determining selected attributes of the virtual conference;
    retrieving information supporting the selected attributes;
    removing an extraneous portion of the information, yielding filtered information and supplementing one or more of the information and filtered information with supplemental information, the information, filtered information and supplemental information defining the virtual conference information;

sending at least a portion of the virtual conference information to a virtual conference bridge; and connecting the host terminal to the virtual conference bridge, thereby setting up the virtual conference including initially the host terminal.

2. The method of claim 1, wherein the step of retrieving information comprises retrieving a portion of the virtual conference information from a virtual conference database.

3. The method of claim 1, wherein the step of retrieving information comprises retrieving a portion of the virtual conference information from the host terminal, the virtual conference information including one or more facial images of a host operating the host terminal.

4. The method of claim 1, wherein the step of determining selected attributes comprises receiving indicia of options selected via the host terminal.

5. The method of claim 4, wherein the step of receiving indicia of options comprises receiving indicia of a selected room type, the step of retrieving information comprising retrieving information associated with the selected room type from a virtual conference database.

6. The method of claim 4, wherein the step of receiving indicia of options comprises receiving indicia of a selected outdoor environment, the step of retrieving information comprising retrieving information associated with the selected outdoor environment from a virtual conference database.

7. The method of claim 4, wherein the step of receiving indicia of options comprises receiving indicia of a selected presentation medium, the step of retrieving information comprising retrieving information associated with the selected presentation medium from a virtual conference database.

8. The method of claim 4, wherein the step of receiving indicia of options comprises receiving indicia of a selected meeting room facility, the step of retrieving information comprising retrieving information associated with the selected meeting room facility from a virtual conference database.

9. The method of claim 1, further comprising:

receiving, from at least one participating terminal, a request to join the virtual conference; and connecting the at least one participating terminal to the virtual conference bridge, thereby joining the at least one participating terminal to the virtual conference.

10. The method of claim 9, wherein the step of retrieving information comprises retrieving information from one or more of: the virtual conference database, the host terminal and the at least one participating terminal, the information from the host terminal and the at least one participating terminal including facial images of operators of the host terminal and the at least one participating terminal.

11. The method of claim 10, wherein the step of removing an extraneous portion of the information comprises removing extraneous information retrieved from one or more of: the virtual conference database, the host terminal and the at least one participating terminal.

12. The method of claim 11, wherein the step of supplementing comprises overwriting at least a portion of the filtered information.

13. The method of claim 10, wherein the step of supplementing comprises overwriting at least a portion of the information retrieved from one or more of: the virtual conference database, the host terminal and the at least one participating terminal.

14. A method comprising:

establishing a virtual conference comprising a host virtual reality terminal and one or more participating virtual reality terminals connected to a virtual conference bridge;

communicating virtual conference information including one or more virtual images among the host terminal and one or more participating terminals via the virtual conference bridge, the virtual images including images retrieved from one or more of: the host terminal, the one or more participating terminals and a virtual conference database; and one or more of:

images derived by removing extraneous information from the retrieved images, defining filtered images;

images derived by overwriting the retrieved images with supplemental information; and images derived by overwriting the filtered images with supplemental information.

15. The method of claim 14, wherein the step of communicating virtual conference information comprises sending images associated with a selected room type to the host terminal and one or more participating terminals.

16. The method of claim 14, wherein the step of communicating virtual conference information comprises sending images associated with a selected outdoor environment to the host terminal and one or more participating terminals.

17. The method of claim 14, wherein the step of communicating virtual conference information comprises sending images associated with a selected presentation medium to the host terminal and one or more participating terminals.

18. The method of claim 14, wherein the step of communicating virtual conference information comprises sending images associated with a selected meeting room facility to the host terminal and one or more participating terminals.

19. A system comprising:

a switching center;

a virtual conference database; and a virtual conference bridge, the switching center being operable to retrieve virtual conference information including one or more virtual images from the virtual conference database and send the information to the virtual conference bridge, the switching center further being operable to connect a host virtual reality terminal and one or more participating virtual reality terminals to the virtual conference bridge, thereby establishing a virtual conference where the host terminal and participating terminals may receive the virtual conference information;

the virtual images including images retrieved from one or more of: the host virtual reality terminal, the one or more participating virtual reality terminals and the virtual conference database; and one or more of:

images derived by removing extraneous information from the retrieved images, defining filtered images;

images derived by overwriting the retrieved images with supplemental information; and images derived by overwriting the filtered images with supplemental information.

20. The system of claim 19 wherein the virtual conference information comprises images associated with one or more of a room type, an outdoor environment, a presentation medium and a meeting room facility, the switching center being operable to retrieve selected images from the virtual conference database and send the selected images to the virtual conference bridge, the host terminal and participating terminals receiving the images upon connection to the virtual conference bridge.

* * * * *